Dec. 11, 1934.  W. J. STRONG  1,983,684
TIRE PAINTING AND TRIMMING MACHINE
Filed Oct. 11, 1932  2 Sheets-Sheet 1
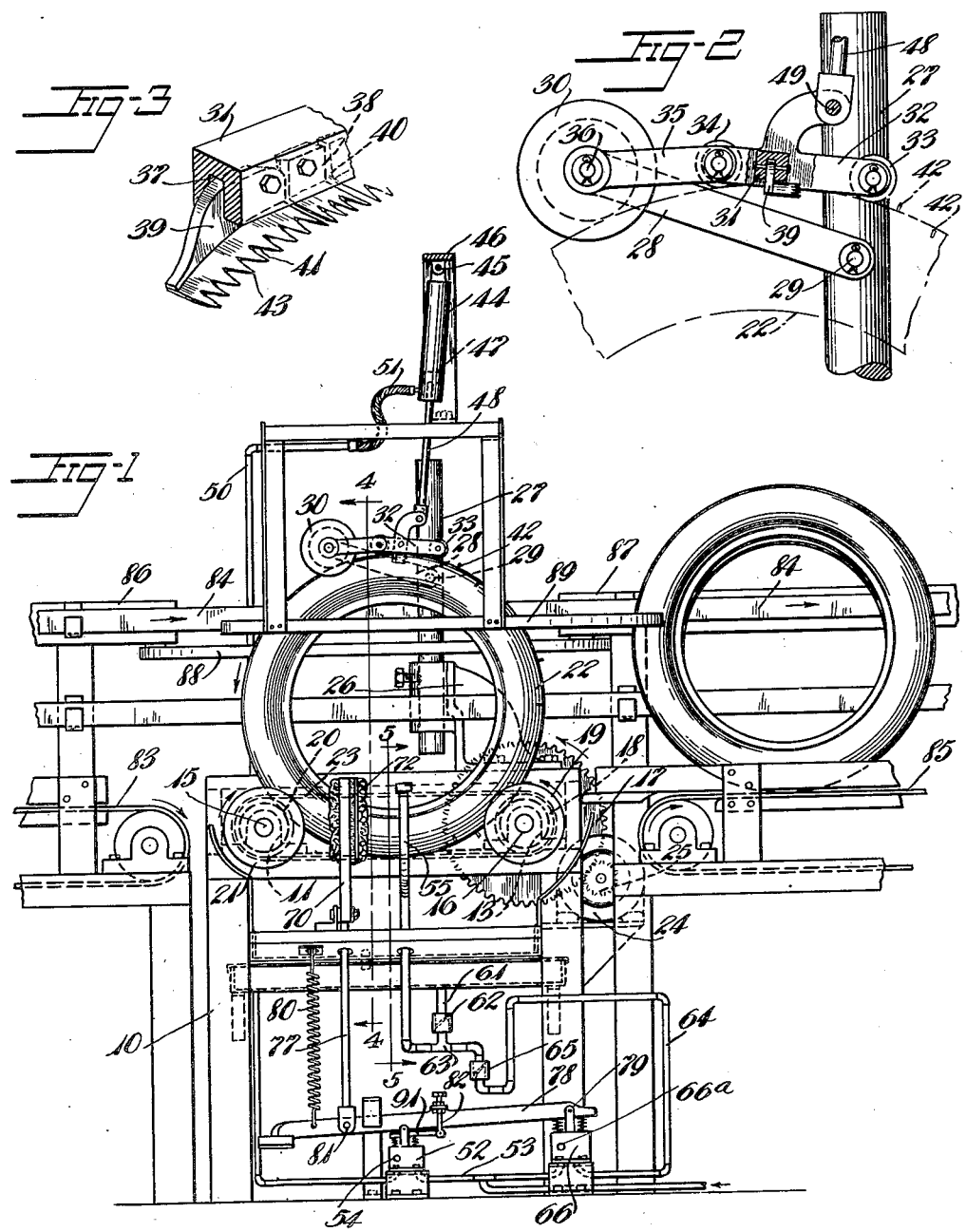
Inventor
Walter J. Strong
By Eakin & Avery
Attys.

Dec. 11, 1934.     W. J. STRONG     1,983,684
TIRE PAINTING AND TRIMMING MACHINE
Filed Oct. 11, 1932     2 Sheets-Sheet 2
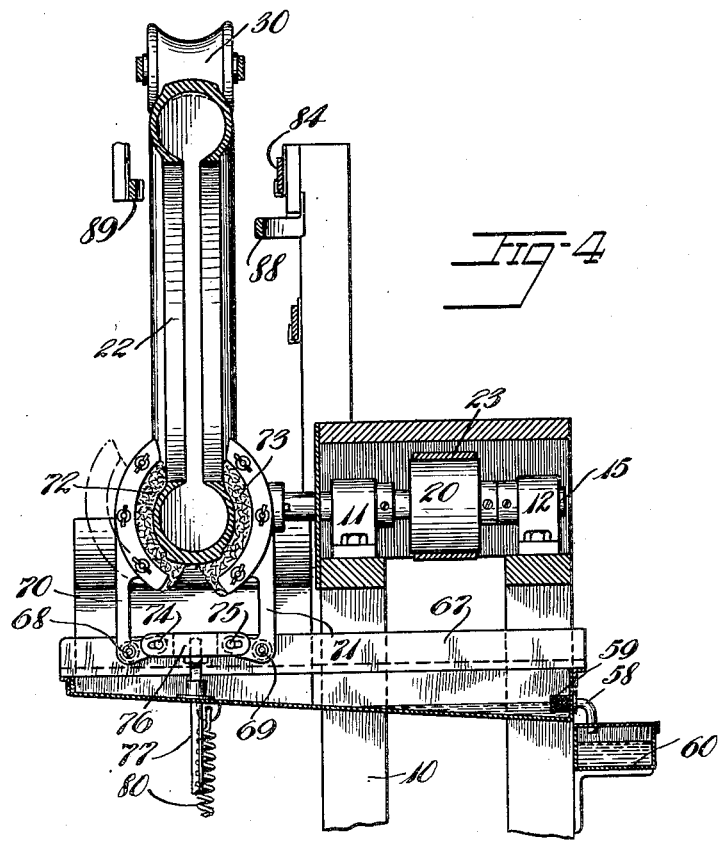
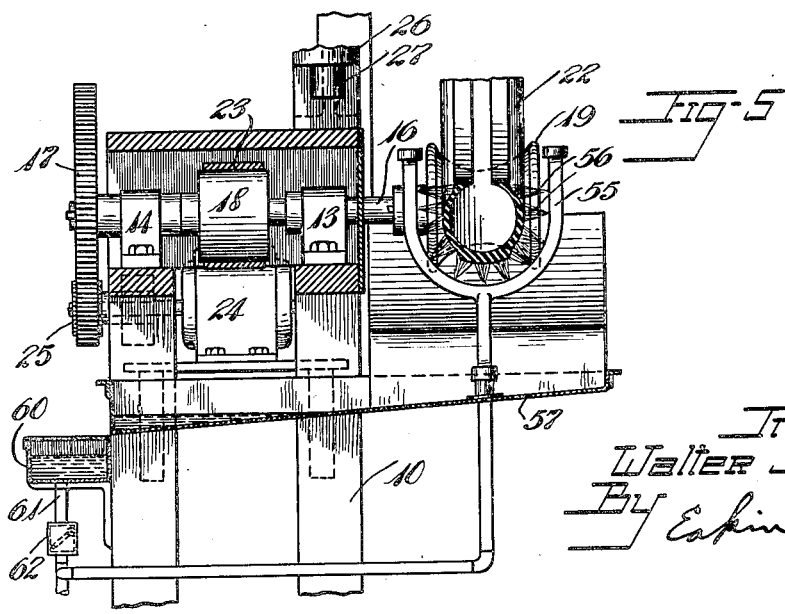
Inventor
Walter J. Strong
By Eakin & Avery
Attys.

Patented Dec. 11, 1934

1,983,684

UNITED STATES PATENT OFFICE 1,983,684

TIRE PAINTING AND TRIMMING MACHINE

Walter J. Strong, Cuyahoga Falls, Ohio, assignor to The B. F. Goodrich Company, New York, N. Y., a corporation of New York Application October 11, 1932, Serial No. 637,299

6 Claims. (Cl. 91—14)

This invention relates to tire painting and trimming machines for use in finishing rubber tires after they have been molded.

In the molding of rubber tires it is necessary to provide vents in the molds to prevent the trapping of air. The plastic material under pressure partially fills these vents, leaving protuberances on the molded article. In order to trim these protuberances from the tire it is necessary to lubricate the cutting instrument. The molded tires are often stained from handling and it is desirable to apply a solution such as a special paint to the suface of the tire to enhance its appearance.

The principal objects of the present invention are to utilize the painting solution as a lubricant for the cutting device and thereby combine the cutting and painting operations in a single device to provide economy and efficiency.

Other objects will appear from the following description and the accompanying drawings.

In the drawings:

Fig. 1 is a side elevation of the device including conveyors for delivering tires to the device and transporting them therefrom, parts of the conveyors being broken away.

Fig. 2 is a detail view in elevation showing the trimming device, parts being broken away.

Fig. 3 is a perspective view of the trimming knife, parts being broken away.

Fig. 4 is a cross section on line 4—4 of Fig. 1.

Fig. 5 is a cross section on line 5—5 of Fig. 1.

Referring to the drawings, the numeral 10 designates the frame of the machine on which are mounted bearings 11, 12, 13 and 14 in which are horizontally journaled a pair of shafts 15 and 16, parallel to each other. Shaft 16 has fixed thereto a gear 17, a pulley 18 and a grooved pulley 19. Shaft 15 has fixed thereto a pulley 20 in alignment with pulley 18 and a grooved pulley 21 in alignment with pulley 19. Shafts 15 and 16 are spaced apart such a distance that grooved pulleys 19 and 21 provide a cradle for supporting a tire casing 22. A belt 23 extends around pulleys 18 and 20 in driving relation thereto. An electric motor 24 drives shaft 16 through a pinion 25 mounted on the motor shaft and engaging gear 17.

A bracket 26, mounted on frame 10, supports a standard 27 to which an arm 28 is pivoted at 29. A grooved roller 30 is rotatably mounted on the free end of arm 28 and rides on the top of the tire 22 when the tire is supported by the cradle rolls.

The trimming device comprises a bar 31 extending transversely of the tire 22 above the same and fixed to a toggle arm 32, one end of which supports a roller 33 and the other end of which supports a roller 34 and is pivoted to one end of a toggle link 35 whose other end is pivoted to arm 28 at 36. The lower face of bar 31 is channeled as at 37 to receive the trimming knives. These knives comprise a stationary blade 38 and flanking floating blades 39 and 40 each having an upstanding flange for engaging the channel 37 and a blade extending substantially at a right angle thereto along the surface of the tire. The edges of the blades extend to face the approaching surface of the tire and are serrated to provide a series of V-shaped cutting edges 41 adapted to cut the protuberances 42 from the tire. To prevent gouging of the surface of the tire, the points 43 are slightly chamfered on the under side and the rollers 33 and 34 are of such size as to cause the knives to slightly clear the tire surface.

A fluid pressure cylinder 44 has its upper end pivoted at 45 to a stationary frame member 46. A piston 47 in the cylinder is positioned to one end of a piston rod 48, the other end of which is pivoted at 49 to arm 32. An air line 50 is connected at one end to a flexible tube 51 which connects with cylinder 44 below piston 47. The other end of line 50 connects to a two-way valve 52 having an air supply line 53 and an exhaust port 54, the arrangement being such that the lower end of cylinder 44 may be connected alternately to the exhaust port 54 and the supply line 53 to permit the knife and guide roller 30 being lowered to contact with the tire or raised to remove the tire.

In order to supply lubricant to the knife and simultaneously coat the tire therewith a U-shaped spray pipe 55 is located between the tire-supporting rollers so as to direct a spray 56 against the outer surface of the tire. A pan 57 is provided for catching excess liquid. It is supported by the frame 10 and has an inclined bottom with an outlet 58 covered by a strainer 59. A second pan 60 receives the liquid which passes the strainer and has a drain pipe 61 having a check valve 62 for preventing back flow. Spray pipe 55 and drain 61 are connected below check valve 62 by a T 63 to a pressure air line 64 through a check valve 65. Air line 64 is connected to a two-way valve 66 which is also provided with the supply line 53 and an exhaust port 66a, the arrangement being such that when pressure line 53 is connected to line 64, check valve 65 opens and 62 closes and the fluid in pipe 55 is sprayed, and when air from pipe 53 is shut off by valve 66 valve 65 automatically closes, valve 62 opens and pipe 55 is partially filled by flow of liquid from pan 60.

To remove excess coating liquid and trimmings from the tire, the following mechanism is provided. A cross member 67 attached to frame 10 carries a pair of pivot pins 68, 69, to which are pivoted a pair of bell crank levers 70, 71. The vertical legs of the levers 70, 71 are arcuately formed and each is provided with an absorbent swab 72, 73 for engaging the surface of the tire. The horizontal legs of levers 70, 71 carry pins 74, 75 which engage slots in a cross-head 76 attached to a rod 77.

A lever 78 is pivoted at 79 on valve 66. It is supported by a coil spring 80. Rod 77 is pivotally connected thereto at 81, so that when lever 78 is depressed swabs 72, 73 are pressed against the tire and when foot pressure is released, spring 80 returns the swabs to non-contacting relation.

Lever 78 also controls valves 52 and 66. The operating lever 91 of valve 52 is connected to lever 78 by an adjustable link 82. When lever 78 is depressed valve 66 is operated to admit air under pressure through pipe 64 to cause liquid to be sprayed from pipe 55, and valve 52 is operated to exhaust cylinder 44 and permit the guide roll 30 and cutter blades to contact with the tire under gravitational forces.

When lever 78 is released, air is admitted through valve 52 to air cylinder 44, raising the roll 30 and the cutter and simultaneously therewith valve 66 is operated to shut off the spray.

The tires are carried into the machine by a conveyor belt 83 on which the tires stand on edge and lean against a belt 84 running at the same velocity as belt 83. The tires are carried from the machine in the same attitude by a similar belt 85 resting against the same belt 84. Rails 86 and 87 behind belt 84 support the same. As a tire approaches the device on belt 83 a guide rail 88 contacts with the side of the tire and deflects the tire to a vertical attitude when it is aligned with rolls 19, 21, and 30. Another guide rail 89 facing the opposite side of the tire prevents the tire from passing beyond a vertical position and, as the tire passes from the painting and cutting device, is so formed as to tip the tire back against the belt 84.

The standard 27 is adjustable vertically in the bracket 26 so that the trimming mechanism may be adjusted for tires of different diameters.

In the operation of the device the pipe 55 sprays a coating solution upon the tire surface which then rotates to bring the coated part to the trimming knives where the knives and work are lubricated by the coating material. The swabs 72 and 73 then remove any excess coating material and trimmings from the tire surface. After a single revolution of the tire the trimming knives and guide roller 30 are raised and simultaneously therewith the spray is shut off and the swabs released from the tire surface. The tire is then assisted past the cradle rolls onto belt 84 by the workman.

I claim:

1. A machine for trimming annular rubber articles, said machine comprising a pair of driven cradle rolls, a guide roll opposite thereto, a trimming device comprising a serrated blade carried by said guide roll and adapted to engage and automatically conform to the surface of the article when the guide roll is in contact therewith, said blade comprising a series of V-shaped cutting edges adapted to engage and cut protuberances from the tire by movement only of the tire, and a single means for retracting said guide roll and trimming means to permit placing of articles in the machine.

2. A machine for trimming and painting annular rubber articles, said machine comprising means for supporting and rotating the article, means for trimming the article as it is rotated, means for applying a lubricating finish coat to the article, and a single device for retracting the trimming mechanism and controlling the coating mechanism.

3. A machine for trimming and painting annular rubber articles, said machine comprising means for supporting and driving the article, spray means for applying a coating of fluid material to the surface thereof, means comprising a blade automatically conformable to the surface of the article and lubricated by the coating on the surface for trimming the article, and a single means for removing excess fluid coating and trimmings.

4. A machine for trimming and painting annular rubber articles, said machine comprising means for supporting and rotating the article, said means including a retractable guide roller, a trimming device carried by said guide roller, means for coating the article to assist the trimming thereof and enhance the appearance thereof, means for removing excess coating and trimmings therefrom, and a single device for retracting the guide roller and controlling the coating means.

5. A machine for trimming annular rubber articles, said machine comprising means for supporting and rotating the article, a serrated trimming blade adapted to trim protuberances from the article, and means for lubricating the blade, said blade being automatically adjustable to conform to articles of different contour.

6. A machine for trimming and painting annular rubber articles, said machine comprising means for supporting and rotating the article, said means including a floating guide roller, and a trimming device carried by said guide roller, said trimming device comprising an articulated blade adapted automatically to conform to the surfaces of articles of different contour, and guide rollers carried thereby to contact with the surface of the article and guide the blade in relation thereto.

WALTER J. STRONG.